(12) United States Patent
Lopez

(10) Patent No.: US 11,162,413 B2
(45) Date of Patent: Nov. 2, 2021

(54) TWO-STROKE INTERNAL COMBUSTION ENGINE

(71) Applicant: SAS THOM THERMIC HYDROGEN OXYGEN MOBILITY, Alès (FR)

(72) Inventor: Didier Lopez, Ales (FR)

(73) Assignee: THOM, Ales (FR)

(*) Notice: Subject to any disclaimer, the term of this patent is extended or adjusted under 35 U.S.C. 154(b) by 0 days.

(21) Appl. No.: 16/494,242

(22) PCT Filed: Mar. 22, 2018

(86) PCT No.: PCT/FR2018/050693
§ 371 (c)(1),
(2) Date: Sep. 13, 2019

(87) PCT Pub. No.: WO2018/172703
PCT Pub. Date: Sep. 27, 2018

(65) Prior Publication Data
US 2020/0131982 A1 Apr. 30, 2020

(30) Foreign Application Priority Data

Mar. 23, 2017 (FR) ...................... 1752425

(51) Int. Cl.
| F02B 43/10 | (2006.01) |
| F02M 26/17 | (2016.01) |
| F02M 26/22 | (2016.01) |
| F02M 26/35 | (2016.01) |

(Continued)

(52) U.S. Cl.
CPC ................ *F02B 43/10* (2013.01); *C25B 1/04* (2013.01); *C25B 9/70* (2021.01); *F02B 33/28* (2013.01); *F02B 75/02* (2013.01); *F02F 7/0021* (2013.01); *F02F 11/005* (2013.01); *F02M 21/0206* (2013.01); *F02M 21/04* (2013.01);

(Continued)

(58) Field of Classification Search
CPC .......... F02B 43/10; F02B 33/28; F02B 75/02; F02M 26/17; F02M 26/22; F02M 26/35; F02M 21/0206; F02M 21/04; F02M 25/12; F02M 27/02; F02M 35/10144; F02F 7/0021; F02F 11/005; C25B 1/04; C25B 9/18; C25B 1/02
See application file for complete search history.

(56) References Cited

U.S. PATENT DOCUMENTS

| 1,750,201 A | 3/1930 | Spencer |
| 2,522,649 A | 9/1950 | Tenney |

(Continued)

FOREIGN PATENT DOCUMENTS

| GB | 2249585 A | 5/1992 |
| JP | H08 93571 A | 4/1996 |

*Primary Examiner* — Syed O Hasan
(74) *Attorney, Agent, or Firm* — Craft Chu PLLC; Andrew W. Chu

(57) ABSTRACT

The two-stroke internal combustion engine has an engine crankcase including a sealing mechanism that, at all times and under all circumstances, confine the oil in the lower crankcase. The two-stroke engine uses a gaseous fuel based on dihydrogen and dioxygen, and releases only water vapor charged with unused gaseous fuel. A device for recycling the exhaust gases serves to recover the unused gaseous fuel and to reinject it at the intake opening, or the exhaust opening.

9 Claims, 4 Drawing Sheets

(51) Int. Cl.
*C25B 1/04* (2021.01)
*F02B 33/28* (2006.01)
*F02B 75/02* (2006.01)
*F02F 7/00* (2006.01)
*F02F 11/00* (2006.01)
*F02M 21/02* (2006.01)
*F02M 21/04* (2006.01)
*F02M 25/12* (2006.01)
*F02M 27/02* (2006.01)
*F02M 35/10* (2006.01)
*C25B 9/70* (2021.01)

(52) U.S. Cl.
CPC ............ *F02M 25/12* (2013.01); *F02M 26/17* (2016.02); *F02M 26/22* (2016.02); *F02M 26/35* (2016.02); *F02M 27/02* (2013.01); *F02M 35/10144* (2013.01); *F02B 2043/106* (2013.01); *F02B 2075/025* (2013.01)

(56) References Cited

U.S. PATENT DOCUMENTS

| | | | |
|---|---|---|---|
| 4,202,297 A | 5/1980 | Oku et al. | |
| 10,605,080 B2* | 3/2020 | Gaj-Jablonski | F02B 75/282 |
| 2009/0260363 A1* | 10/2009 | Moriarty | F01K 23/10 60/719 |
| 2014/0216366 A1* | 8/2014 | Monros | C25B 1/04 123/3 |
| 2015/0152562 A1* | 6/2015 | Bernical | C01B 3/32 205/628 |

* cited by examiner

TWO-STROKE INTERNAL COMBUSTION ENGINE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the fields of transport and renewable energies. More particularly, the invention relates to a traction system using renewable energies for towing a vehicle and preferably an aquatic vehicle.

2. Description of Related Art Including Information Disclosed Under 37 CFR 1.97 and 37 CFR 1.98

It should be noted that the expression "aquatic vehicle" corresponds in this document to a vehicle traveling on a waterway whether it is fluvial or maritime.

Initially, the aquatic transport of goods and people on all waterways but also travel for professional activities (fishing, surveillance, scientific activities, police and military, tourism, etc.) as well as boating, had many advantages. Indeed, sailing uses, directly at the place of use, wind energy which is both free and completely renewable. In addition, sailing also has the advantage of producing no discharge and no pollution to produce this energy or exploit it.

The economic context of the twentieth century, and in particular the need to transport more and more rapidly quantities of goods and/or people became increasingly important over time and has led to the replacement of the use of wind energy through the use of fossil fuels as a source of displacement energy. Faced with this evolution, the disadvantages of wind energy which has not been stored and whose availability is intermittent or non-existent on certain river channels have become prohibitive. The following observation is made, sailing is no longer in line with our current needs and future.

Nowadays, sailing is only used for pleasure and competition; it is no longer used for transport, especially maritime and fluvial, using, with rare exceptions, fossil fuels as a source of energy to move.

However, the entry into the twenty-first century has highlighted a depletion of fossil energy resources which were hitherto abundant and sometimes even considered unlimited. This reduction in the availability of fossil fuels is reflected in a steady rise in prices on international markets. As a result, the consumption of fossil fuels is having a greater impact on the cost of transport.

In addition, the consumption of fossil fuels also impacts the public health environment.

On the one hand, it is accepted that the combustion of fossil fuels causes direct pollution generated by gas combustion ($CO_2$, particles, etc.). These combustion discharges contribute to the deterioration of environmental conditions such as the reduction of the ozone layer due in particular to the amplification of the greenhouse effect, the quality of the air, the quality of the fluvial or maritime waters. This environmental degradation, in turn, affects the fauna and flora. In turn, public health is impacted by these environmental degradations which are, in particular, sources of respiratory, skin and metabolic disorders. On the other hand, the use of fossil fuels also involves pollution generated upstream during their extraction, processing, and transportation and pollution generated downstream during the depletion of equipment.

Finally, even if it is a punctual phenomenon, the accidental pollution heavily impacts the environment, fauna, and flora in an area determined to be near the place of the accident.

In view of the disadvantages of using fossil fuels as a source of displacement, electric motorization projects powered by solar energy have been developed. These projects make it possible to consider viable long-term solutions.

However, at the present time, solar energy has the inconvenience of being intermittent and the storage of solar energy in the form of electricity generated by photovoltaic panels in batteries presents a number of problems and does not constitute a satisfactory solution. If, during the operation, the production of electricity by photovoltaic panels is not polluting, storage of electricity in batteries is not so advantageous.

First, the manufacture of a battery is polluting and requires limited resources, for example, lithium, cobalt or manganese. In addition, a battery has a complex design; it may include a specific electrolyte formed by complex salts, electrodes formed by metal oxides or graphite, which are all elements to isolate for recycling. From these findings, it becomes clear that the elimination/recycling of a battery is not a trivial act, but complex, energy-consuming and polluting.

Another alternative solution has been envisaged with the use of electrolysis and in particular the supply of an electric motor by a fuel cell. However, currently, the fuel cell has an energy chain yield too low to be exploitable.

BRIEF SUMMARY OF THE INVENTION

Many countries, such as France, have extensive waterways or multiple maritime accesses that are transport routes that are no longer sufficiently used. In this context, the present invention aims to take advantage of this transport. For these purposes, the present invention provides a solution for generating the movement of a vehicle from renewable energies, whatever the weather conditions.

For this purpose, the applicant is to develop a traction system of a vehicle, the traction system comprising electrical production means that feed the combustion gas generators. Advantageously, the combustion gases are stored in a pressurized storage unit which supplies a heat engine, while the electrical production means comprise photovoltaic panels, a wind generator and/or a tidal generator.

More particularly, in order to optimize the efficiency of the traction system, the applicant has developed a two-stroke combustion engine adapted to be fed with a gas mixture.

In this context, the invention relates to a two-stroke combustion engine which comprises a crankcase comprising an upper crankcase and a lower crankcase which contains oil for lubricating a piston from a low dead position to a compression position, the two-stroke engine comprises sealing means that confine at any time and under any circumstances, the oil in the lower crankcase.

The two-stroke combustion engine is characterized in that the upper crankcase comprises, on the one hand, an intake port for introducing a gaseous fuel based on dihydrogen and oxygen, and on the other hand, an exhaust port which, by maintaining the oil in the lower crankcase, discharges only water vapor loaded with unused fuel gas, the exhaust port is connected to an exhaust gas recirculation device for recovering the unconsumed gaseous fuel and injecting it back to the intake port level. Advantageously, the engine according to the invention makes it possible to recover all the gaseous fuel that has not been consumed. As a result, the efficiency of the two-stroke combustion engine is optimized while eliminating any pollutant discharge from the combustion of fuel and/or engine lubricating oil.

According to a first characteristic of the invention, the recycling device comprises a heat exchanger separating the steam from the gas mixture that is not consumed by condensation.

According to a second characteristic of the invention, the sealing means comprise a sealing member formed on the upper part of the piston. The sealing member serves to maintain the oil in the lower crankcase from the bottom dead center position of the piston to the intake port and/or the exhaust port.

According to a third characteristic of the invention, the sealing means comprise two sealing elements for respectively obstructing the exhaust port and the intake port. Advantageously, the sealing elements ensure the maintenance of the oil in the lower crankcase when the piston reaches or exceeds the intake ports and/or the exhaust port. More particularly, the sealing elements are mounted laterally on the piston and extend longitudinally on either side of the piston.

According to a fourth characteristic of the invention, the two-stroke combustion engine comprises a mixer disposed upstream of the intake port, the mixer allows the mixing of the dihydrogen and the oxygen, both pressurized, to create the gaseous fuel suitable for combustion by thermo catalysis.

Advantageously, the mixer also comprises a compressed air inlet for mixing dioxygen and dihydrogen with compressed air and varying the dioxygen dihydrogen concentration in the gaseous fuel makes it possible to modulate the engine speed.

Preferably, the mixer is connected to the intake port via an intake duct. In addition, it should be noted that the soft gaseous fuel consumed at the outlet of the recycling device is reinjected via a recovery line at the mixer.

According to a fifth characteristic of the invention, within the upper crankcase, the exhaust port is positioned higher than the intake port.

According to another embodiment of the invention, the sealing means comprise, in the lower crankcase, an expansion system contributing to maintaining the oil in the lower crankcase at any time and under any circumstances.

Advantageously, the sealing member and the expansion system cooperate in such a manner as to hermetically isolate the upper crankcase from the lower crankcase at any time and in any circumstances, avoiding that oil which is passed from the lower crankcase to the combustion chamber. This overcomes one of the main disadvantages of a conventional two-stroke engine that burns oil in the combustion chamber, thus rejecting oil combustion residues that are extremely polluting.

BRIEF DESCRIPTION OF THE SEVERAL VIEWS OF THE DRAWINGS

Other particularities and advantages will appear in the following detailed description of two non-limiting exemplary embodiments of the invention illustrated in FIG. 1 to 11 in the appendix.

DETAILED DESCRIPTION OF THE INVENTION

The present invention relates to a traction system 1 of a vehicle 2, preferably an aquatic vehicle 2 adapted to navigate on fluvial and/or maritime routes. Advantageously, the traction system 1 according to the invention makes it possible to feed propulsion means of a vehicle 2, whatever the weather conditions, from renewable energies, such as solar energy, wind energy and also the hydraulic power for an aquatic vehicle.

Figure 1:
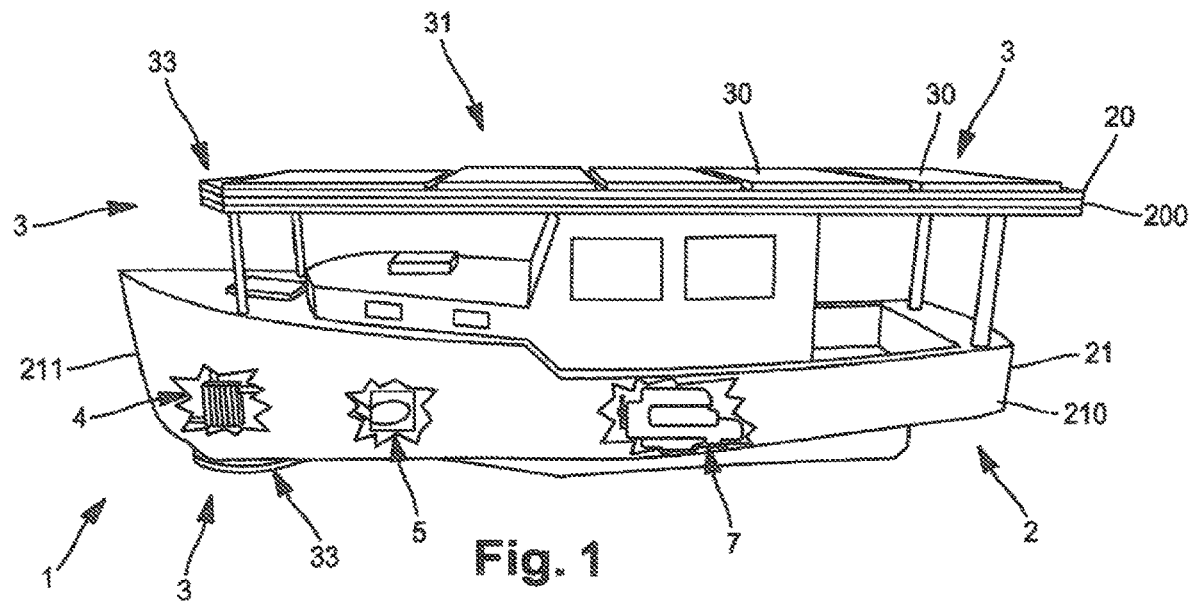
FIG. 1 corresponds to a schematic view of a representation of an aquatic vehicle equipped with a traction system according to the invention.
Figure 2:
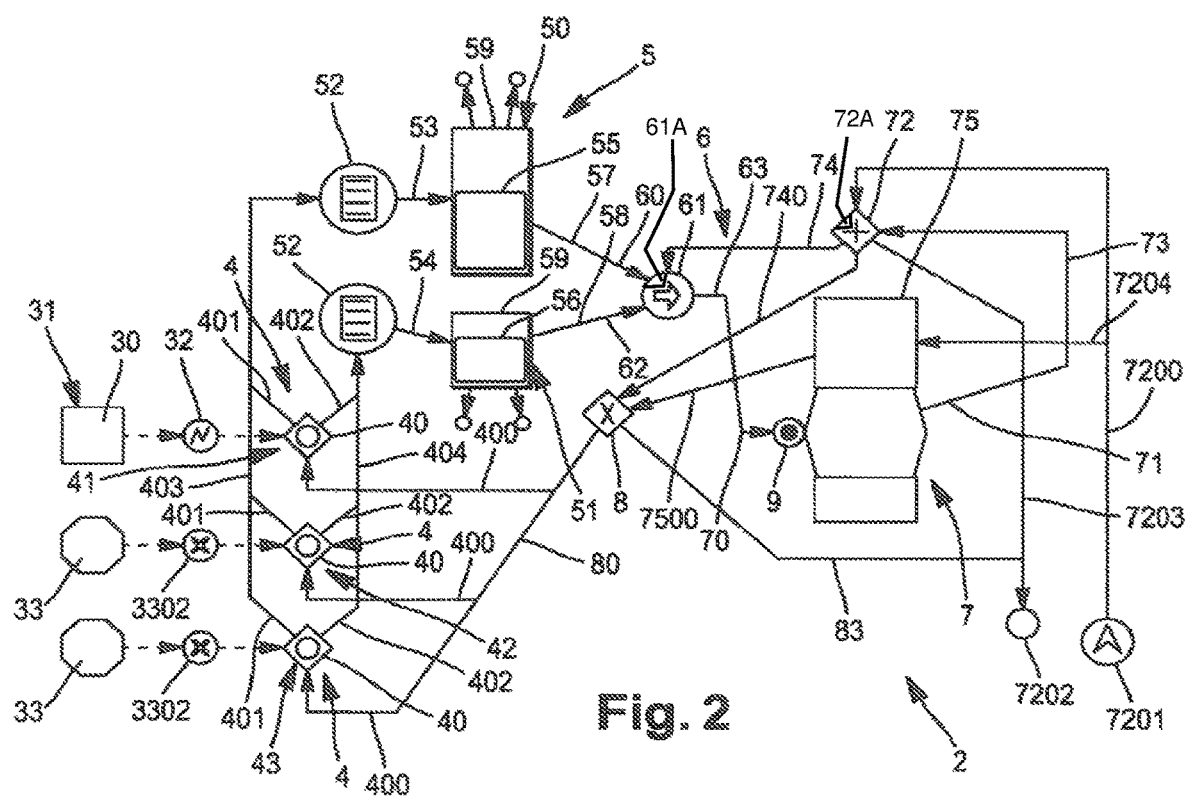
FIG. 2 is a schematic view of a diagram illustrating a traction system according to a first embodiment of the invention.

In this regard, the traction system 1 illustrated in FIGS. 1 and 2 comprise means of electrical production 3 from renewable energies.

For these purposes, the electrical production means 3 are adapted to capture the solar energy by means of a photovoltaic panel 30, and preferably an assembly 31 of photovoltaic panels 30. In the particular case of an aquatic vehicle 2, the photovoltaic panels 30 used comprise an outer coating compatible with marine use, that is to say, an exterior coating particularly resistant to high salt corrosion conditions. The electrical production means 3 comprise a converter 32 at the output of the photovoltaic panels 30 making it possible to produce electricity at a determined voltage.

In the example illustrated in FIG. 1, in order to confer maximum exposure to the sun's rays, the photovoltaic panels 30 are arranged at the level in height with an awning 20 of the vehicle 2.

It should be noted that the photovoltaic panels 30 may be equipped in addition to a sun optimization system, for varying the orientation of the photovoltaic sensors. The sun optimization system may, for example, be constituted by jacks adapted to vary the inclination of the photovoltaic panels 30.

In addition, in order to optimize the production of electricity, the electrical production means 3 comprise a wind power device and a hydraulic device respectively adapted to produce electricity by capturing the flow of water or air circulating in the immediate vicinity of the water vehicle 2. Each wind and hydraulic device generate electricity via an alternator and are connected to a converter 32 so as to provide electricity at a determined voltage.

However, the fact of integrating both a wind turbine device and a hydraulic device into a vehicle 2 presents constraints to which the state of the art with regard to wind and hydraulic devices does not propose a solution.

Indeed, there are at least two types of wind turbine devices, on the one hand, a wind turbine called "horizontal axis" which is the most common and has blades perpendicular to the axis of rotation and the airflow, and on the other hand, a wind turbine called "vertical axis."

In both cases, these turbines have a rotor which must be placed as high as possible to be exposed to regular air flows and not impacted by turbulence both on the ground and on the surface of the water. In addition, the rotor of the horizontal axis wind turbines must be arranged higher than its vertical blades, which must be large enough to drive rotation in the rotor and the alternator. However, such features are incompatible with the constraints of a vehicle 2 intended to move while capturing multiple orientation airflows so as to generate electricity.

In the same way, there are several types of a hydraulic device called "tidal turbine" that can capture a flow of water and generate electricity using an alternator. In general, it is a large turbine that is rotated by a hydraulic flow, for example, US marine current. However, to be embedded on an aquatic vehicle 2, a turbine must be of modest dimensions while having enough torque to allow the capture of hydraulic flows, whatever their orientation.

In this context, the applicant has developed a technical solution that can capture both a flow of water as well as a flow of air, whatever their direction, and channel it into laminar flow, and accelerate the laminar flow in the direction of a turbine adapted to drive an alternator.

As illustrated in FIGS. 1 and 2, the traction system 1 is equipped with a device 33 for transforming kinetic energy of a fluid flow 3300 into mechanical energy through a turbine 3301, rotatably mounted and adapted to enter in rotation in response to the kinetic energy of a fluid flow 3300.

Figure 11:
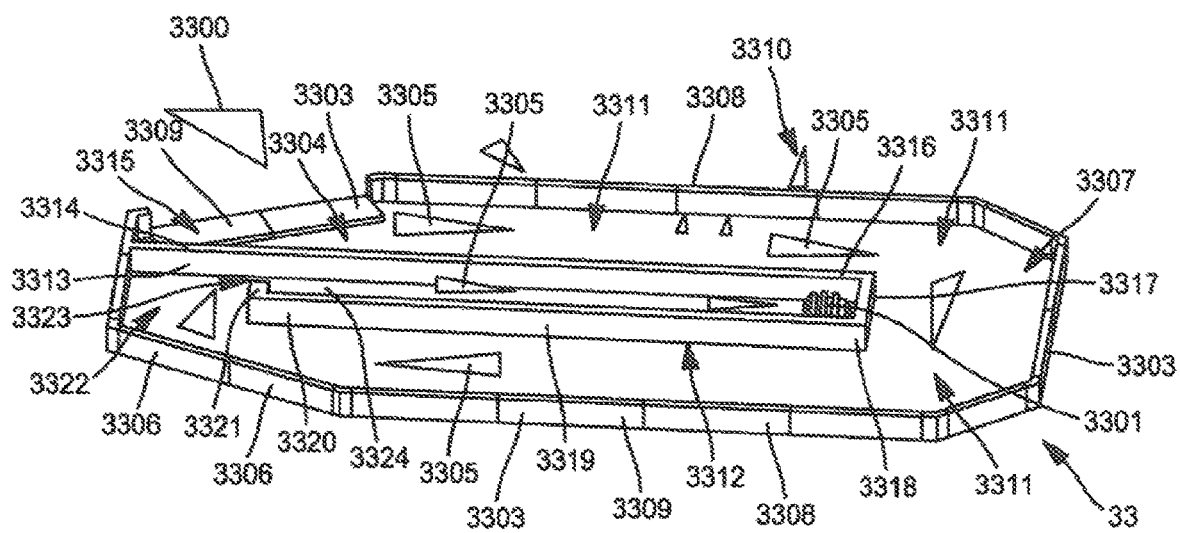
FIG. 11 is a schematic view corresponding to a representation of a device for transforming the kinetic energy of a fluid into mechanical energy; this transformation device equipping the vehicle of FIG. 1.

The fluid flow 3300 is illustrated in FIG. 11 by arrows oriented towards the transformation device 33. Here, the turbine 3301, for example of the squirrel cage type, that is to say, a turbine which comprises a blade wheel mounted on an axis of rotation.

The axis of rotation is perpendicular to the flow of fluid and connected to a rotary mechanical receiver 3302, such as an alternator, so as to transform the mechanical rotational energy of the turbine 3301 into electrical energy (illustrated in FIG. 11).

In the example illustrated in FIG. 11, the transformation device 33 comprises, on the one hand, multidirectional fluid flow 3300 sensing members 3303 for sensing a flow of fluid 3300, whatever its orientation, and on the other hand, guiding means 3304, so as to generate a flow of laminar fluid 3305 towards the turbine 3301. It should be noted that the flow of laminar fluid 3305 is illustrated in FIG. 11 by arrows situated inside the transformation device 33 following the guide means in the direction of the turbine 3301.

Here, the guiding means 3304 of the fluid flow 3300 are preferably horizontal and consist of a multi-sided chamber 3306 which extends horizontally. The multi-sided chamber 3306 is delimited, on the one hand, above and below, respectively, by an upper floor and a lower floor 3307 which extend in a direction parallel to the multi-sided chamber 3306, and on the other hand, laterally by lateral faces 3308 which will extend perpendicular to the multi-sided chamber 3306 at a defined height.

As shown in FIG. 1, in view of integrating the transformation device 33 into the vehicle 2, the lateral faces 3308 of the multisided chamber 3306 merge with a frame 21 of the vehicle 2. In the case of a transformation device 33 acting as a submerged or partially-submerged turbine, the lateral faces 3308 of the multisided chamber 3306 merge with the external walls 210 of the frame 21 of the vehicle 2 here, and the level of the hull 211 of the vehicle 2 is near the waterline of the vehicle 2 or is fully submerged below the waterline of the vehicle 2.

Conversely, in the case of a transformation device 33 acting as a wind turbine, it must be available at the level of an air structure of the frame 21 of the vehicle 2, for example at the level of the awning 20. In this case, the lateral faces 3308 of the multisided chamber 3306 merge with lateral external walls 200 of the awning 20.

In the example illustrated in FIG. 11, each lateral face 3308 comprises a fluid flow 3300 sensing member 3303, each sensing member 3303 is formed by a movable flap 3309 for rotation about an axis. It follows from this characteristic of each sensing member 3303 that it is movably mounted between a closed position and an open position. Thus, when the sensing member 3303 is in the closed position, it exerts a mechanical reaction to the fluid flow 3300 partitioning the multisided chamber 3306. Conversely, when the sensing member 3303 is in the open position, the fluid flow 3300 enters the multi-sided chamber 3306.

In the present example, the sensing member 3303 is mechanically designed to move from a closed position to an open position, and vice versa. For this purpose, each sensing member 3303 has a determined mechanical reaction threshold 3310 illustrated in FIG. 11 by a reaction arrow. This mechanical reaction threshold 3310 can be conditioned, for example, by mechanical means, through elastic rotation of the sensing member 3303 from its axis. Therefore, when a fluid flow reaches a speed that is sufficient enough to apply on the sensing member 3303 a force greater than its mechanical reaction threshold 3310, the sensing member 3303 moves from its closed position to its open position. Once the sensing member 3303 is in the open position, the fluid flow 3300 enters the multisided chamber 3306.

As illustrated in FIG. 11, the multisided chamber 3306 includes a fluid flow 3300 guide channel 3311. The guide channel 3311 has the particularity of being delimited laterally, on the one hand, by all the lateral faces 3308 of the multi-sided chamber 3306, and, on the other hand, by an inner wall 3312 which is wound on itself in order to follow the orientation of the lateral faces 3308. For these purposes, the inner wall 3312 has a first section 3313 connected from a first side 3314 to a lateral face 3308 disposed at a first end 3315 of the guide channel 3311, the first section 3313 extending in the longitudinal direction of the multi-sided chamber 3306. A second end 3316 opposing the first end 3314 of the first section 3313 is connected to a second section 3317 of the inner wall 3312 which acts as a junction with a first end 3318 of a third section 3319 of the inner wall 3312. The third section 3319 also extends in the longitudinal direction of the multisided chamber 3306 to a second end 3320 opposite the first end 3318 and at which the inner wall 3312 is extended by a fourth section 3321 located at the level of a second side 3322 of the guide channel 3311. The fourth section 3321 of the inner wall 3312 defines a junction zone 3323, which marks the end of the guide channel 3311 and communicates with an acceleration channel 3324.

In the present example, the acceleration channel 3324 extends longitudinally in a gap formed between the first and third sections 3313, 3319 of the inner wall 3312 to the turbine 3301 which is positioned near the second section 3317 of the inner wall 3312. Advantageously, the fourth section 3321 of the inner wall 3312 contributes to the reduction of the section of a port of the acceleration channel 3324 promoting the acceleration of laminar fluid flow 3305 by the venturi effect. Advantageously, the acceleration of the laminar fluid flow 3305 makes it possible to increase the torque of the turbine 3301 and thus to optimize the electric production efficiency of the transformation device 33.

As illustrated in FIG. 11, when the fluid flow 3300 enters the multi-sided chamber 3306 by the lateral face 3308 furthest from the acceleration channel 3324 located on the first side 3315 of the guide channel 3311, the fluid flow 3300 is channeled into laminar fluid flow 3305 and directed directly to the turbine 3301. Advantageously, the guide channel 3311 cooperates with the acceleration channel 3324 so as to constrain the laminar fluid flow 3305 to make a substantially spiral-shaped stroke.

Conversely, if the fluid flow 3300 enters through a lateral face 3308 which has one or more lateral faces 3308 upstream of its position, that is, towards the first side 3315 of the guide channel 3311, in this case, the fluid flow 3300 entering the multi-sided chamber 3306 first sets the multi-sided chamber 3306 under pressure, then the guide channel 3311 converts the fluid flow 3300 into a laminar fluid flow 3305, and the directs it towards the turbine 3301 via the acceleration channel 3324, while passing through the latter, the laminar fluid flow 3305 is accelerated the venturi effect, that is to say, by the narrowing of the port of the acceleration channel 3324.

It should be noted that when a fluid flow 3300, 3305 enters the multi-sided chamber 3306, the fluid flow 3300, 3305 applies an internal pressure on the sensing members 3303 thereby increasing their mechanical reaction threshold 3310 to a fluid flow 3300 outside. Advantageously, this characteristic only favors the entry of the most powerful fluid flow 3300 within the multi-sided chamber 3306. Thus, when the orientation of the largest fluid flow 3300 changes, the sensing members 3303 react: the sensing member 3303 corresponding to the previous orientation of the strongest fluid flow 3300 closes and at the same time, the new sensing member 3303 is located in the axis of the new orientation of the strongest fluid flow 3300 and opens to let it enter the multi-sided chamber 3306.

As illustrated in FIG. 1, the ability to capture a fluid flow 3300 in a multi-sided chamber 3306 that extends horizontally makes it possible to gain compactness and promotes the superposition of several transformation devices 33 on one another. Here, the vehicle 2 is equipped with several transformation devices 33 disposed, on the one hand, at the awning 20 of the vehicle 2 and thus acting as a wind turbine, the awning 20 also being covered with photovoltaic panels 30, and, on the other hand, at the hull 211 of the vehicle 2 where they act as a tidal turbine.

The use of an acceleration channel 3324 to accelerate the laminar fluid flow 3305 makes it possible to estimate that the electric power of the turbine 3301 approximately follows the "Betz limit." By using the formula of the "Betz limit," it is possible to estimate power in watts from, in particular, the speed of fluid in the following formula:

$$Pw = 16/27 \times 1/2 \times p \times S \times V^3$$

With,

Pw=power watts p=density of the fluid

S=surface in m²

V=fluid velocity in m/s

In the example illustrated in FIG. 2, the useful electricity production at the output of the electrical production means 33 is transmitted to a converter 32, which supplies electricity at a determined voltage of the combustion gas generators 4. Here, the gas generators 4 are formed by electrolysis cells 40, which are organized in groups. Preferably, the electrolysis cells 40 are organized in three groups: a solar group 41 which is powered by the photovoltaic panels 30, a wind group 42 which is fed by a transformation device 33 acting as a wind turbine, and a hydraulic unit 43 which is fed by a transformation device 33 acting as a tidal turbine.

Preferably, each group 41, 42, 43 of electrolysis cells 40 comprises several electrolysis cells 40 connected in parallel. The three groups 41, 42, 43 of electrolysis cells 40, are also connected in parallel with each other.

As explained in Table 1 below, the electrical production means 3 make it possible to feed on three types of renewable energy (solar, wind, hydraulic) with at least one group 41, 42, 43 of electrolysis cells 40 corresponding to the renewable energy that is available. The ability to generate electricity from three different renewable energies makes it possible to maintain the production of combustion gases almost continuously. Each renewable energy source has availability that depends on atmospheric conditions. Here, the electrical production means 3 can produce electricity almost permanently, overcoming the problem of regular intermittency of renewable energy sources.

| Situation | Photovoltaic | Aeolian | Tidal | Gas storage |
|---|---|---|---|---|
| Day Clear weather Calm | Strong | Nothing Beaufort scale <2 | Low | Strong |
| Night Clear weather Calm | Nothing | Nothing Beaufort scale <2 | Low | Low |
| Day Clear weather Agitated | Strong | Average Beaufort scale 2 to 4 | Average | Strong |
| Night Clear weather Agitated | Nothing | Average Beaufort scale 2 to 4 | Average | Average |
| Day Covered Calm | Average | Nothing Beaufort scale <2 | Low | Low |
| Night Covered Calm | Nothing | Nothing Beaufort scale <2 | Low | Low |
| Day Covered Agitated | Average | Strong Beaufort scale >4 | Strong | Strong |

| Situation | Photovoltaic | Aeolian | Tidal | Gas storage |
|---|---|---|---|---|
| Night Covered Agitated | Nothing | Strong Beaufort scale >4 | Strong | Strong |

In this example, the electrolysis cells 40 are supplied with water from either a reservoir or a surrounding aquatic environment when the vehicle 2 is aquatic.

Each group 41, 42, 43 of electrolytic cells 40 is supplied with a catalyst or electrolyte such as aqueous sodium chloride (NaCl) in ionic form (Na$^+$(aq), Cl$^-$(aq)) which is naturally present in seawater.

In a known manner, the electrolysis of water makes it possible to produce dihydrogen and dioxygen in gaseous form according to the following equation:

$$2H_2O(l) ==> O_2(g) + 2H_2(g)$$

These two gases mixed with each other under pressure have remarkable combustion properties that we wish to exploit in the context of the traction system 1 of the present invention.

However, these combustion properties force us to isolate the dihydrogen and the dioxygen from each other and to store them independently. For this purpose, in a known manner during the electrolysis of water, the dioxygen is formed by an oxidation reaction at the anode of an electrolysis cell 40. Conversely, dihydrogen is formed by a reduction reaction at the cathode. In this context, it is possible to isolate the production of dihydrogen from the production of dioxygen by separating the cathode and the anode.

According to this precept, for example, each electrolysis cell 40 fitted to the traction system 1 may consist of a chamber filled with an electrolyte which corresponds to an aqueous electrolytic liquid under pressure.

Here, the aqueous electrolytic liquid designates water loaded with electrolytic salts favoring the conductivity and the formation of dioxygen and dihydrogen.

In the present example, the chamber of each electrolysis cell 40 comprises a transient compartment equipped, on the one hand, with an electrolyte supply promoting the oxidation/reduction reactions, and on the other hand, with a pressurized hot water supply 400 which supplements the mechanical input by differential pressure and/or volume so that the electrolyte remains within the electrolysis cell 40.

The transient compartment is connected, on the one hand, to an anode compartment in which a completely immersed anode electrode or anode is disposed, and, on the other hand, to a cathode compartment in which a completely immersed cathode electrode or cathode is disposed. It should be noted that the transient compartment also allows the flow of electric current between the anode and the cathode.

The cathode and anode compartments respectively comprise a dihydrogen-loaded water outlet 401 and a dioxygen-loaded water outlet 402 which are both connected to a water/gas separator adapted to separate the dioxygen and/or dihydrogen from the aqueous electrolytic liquid. At the outlet of the water/gas separator, the dihydrogen and dioxygen are respectively sent into a compression/storage circuit 403, 404 which is specific to them; while the electrolyte borrows a return pipe to return to the chamber of the electrolysis cell 40.

As illustrated in FIG. 2, each electrolysis cell 40 of each group 41, 42, 43 is connected, on the one hand, to the compression/storage circuit 403 of the dihydrogen, and, on the other hand, to the compression/storage circuit 404 of the dioxygen. Each storage circuit 403, 404 makes it possible to route the dihydrogen and the dioxygen respectively to a pressurized storage unit 5 dedicated thereto. Thus, the traction system 1 includes a first storage unit 50 dedicated to the storage of dihydrogen, and a second storage unit 51 dedicated to the storage of dioxygen.

Each storage unit 50, 51, is equipped with a compressor 52 adapted to compress the gas before it is stored. The compressor 52 is disposed at the inlet 53, 54 of a storage enclosure 55, 56 which includes a first safety pressure switch for controlling the internal pressure of the storage enclosure 55, 56. The first safety pressure switch is programmed to trigger an audible alert, for example, when the pressure approaches a predetermined mechanical resistance threshold.

Moreover, in order to prevent any accidental breakage of the storage enclosure 55, 56, it is wrapped by an empty safety compartment 59, 60 at low pressure, for example, at a pressure less than 5 bars. The safety compartment is equipped with a second safety pressure switch set to eliminate any leakage, even minimal, of the storage enclosure 55, 56. Thus, in the event of a small variation in the pressure of a safety compartment 59, 60, detected by the latter, the latter is programmed to trigger an alert, for example, an audible signal, signaling an abnormal pressure of the safety compartment 59, 60. Thus, it is possible to put the entire system at a standstill, empty the compartment 59, 60 concerned by the alert, locate the breaking zone and treat it.

In addition, at the outlet 57, 58 of each storage enclosure 55, 56 is arranged an expansion valve allowing at least the partial depressurization of the gas stored before it enters under a lower pressure in a supply circuit 6 to feed a heat engine 7.

As indicated above through the formula of the electrolysis of water, this reaction produces twice as much, and therefore twice as much volume, of dihydrogen as dioxygen. This parameter is taken into account in the design of the storage enclosure 55 of dihydrogen which has a storage capacity twice as large as the storage capacity of the storage enclosure 56 of the dioxygen.

In the example illustrated in FIG. 2, the supply circuit 6 comprises a first pipe 60 conveying the dihydrogen under pressure from its storage unit 50 to a mixer 61. In parallel, a second pipe 62 conveys the dioxygen under pressure from its storage unit 51 to the mixer 61. The mixer 61 mixes dihydrogen and dioxygen, both of which are pressurized in order to create a gaseous mixture suitable for combustion by thermo catalysis. The mixer 61 also includes a compressed air supply 61A to allow the mixer to mix compressed air with dioxygen and dihydrogen.

Advantageously, the supply of compressed air at a pressure substantially identical to that of dihydrogen and of dioxygen makes it possible to vary the richness of the fuel concentration of the combustion mixture in order to modulate the speed of the heat engine 7 by 0% when the heat engine 7 is stopped and at 100% when the heat engine 7 is at full speed.

In addition, the supply of compressed air also promotes the combustion and the availability of the oxidant by adding dioxygen to the dioxygen storage enclosure 56 to dioxygen naturally available in compressed air.

Finally, the supply of readily available compressed air makes it possible to supplement at a lower cost, the volumetry of the gaseous mixture necessary for the operation of the heat engine 7.

At the outlet of the mixer 61, the gaseous mixture is injected into the heat engine 7 via an intake duct 63.

In the same way, as for the storage enclosure 55, 56, the supply circuit 6 may have a safety envelope equipped with a pressure switch for each of these elements: the pipes 60, 62, the mixer 61, and the intake duct 63.

According to a first embodiment of the invention, the traction system 1 is equipped with a standard heat engine 7. The intake duct 63 supplies an inlet 70 of the heat engine 7 with a low-pressure gas mixture, preferably between a few hundred millibars and a few bars.

Advantageously, it is accepted that the combustion of the gaseous mixture of pressurized dihydrogen/dioxygen produces only water vapor according to the formula below:

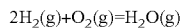

$$2H_2(g) + O_2(g) = H_2O(g)$$

Dihydrogen and dioxygen are combustion gases; here, dihydrogen plays a role of fuel while dioxygen plays its usual role of oxidizer in addition to dioxygen from compressed air. In this context, the exhaust 71 of the heat engine 7 is water vapor and a non-burned fraction of the gas mixture initially introduced into the inlet 70 of the heat engine 7. In order to prevent any exhaust 71 gases from escaping from the heat engine 7 and to optimize the efficiency of the heat engine 7, the traction system 1 comprises an exhaust gas recycling device 72 which is arranged at the exhaust 71 level.

In this example, the exhaust gas recycling device 72 makes it possible to capture, directly in the exhaust 71 from the heat engine 7, the unconsumed combustion gases and reinject them at the level of the inlet 70 of the heat engine 7. For this purpose, the recycling device 72 comprises a heat exchanger 72A for condensing the exhaust gas to obtain hot water between 70° C. and 90° C., which is charged with unconsumed combustion gases. In order to reinject the unconsumed combustion gases into the heat engine 7, the recycling device 72 is adapted to separate the steam from the unconsumed combustion gases. In this example, the water vapor is separated from the combustion gases unconsumed by condensation. At atmospheric pressure, the water vapor condenses at a temperature below 100° C., whereas dihydrogen and dioxygen cannot be condensed at atmospheric pressure at positive temperatures.

In order to condense the water vapor, the recycling device 72 uses a heat transfer liquid. Here, the recycling device 72 consists of a heat exchanger which uses cold water as a coolant. Cold water preferably has a temperature below 20° C. and comes from a water supply line 7200 which is supplied by a 7201 hydraulic pump.

Preferably, in the case of an aquatic vehicle 2, the hydraulic pump 7201 draws water into the surrounding environment. In order to avoid clogging the pipes of the traction system 1, gravimetric filtration is carried out at the pump 7201, for example via a multi-level ceramic filter.

At the outlet of the recycling device 72, on one side, the steam condenser is discharged to an evacuation 7202 passing through a first evacuation pipe 7203, while the unconsumed combustion gases are reinjected via a conduit recovery 74 in the mixer 61. It should be noted that the combustion gases consumed are compressed at the inlet of the mixer 61 so that the mixer 61 delivers to the intake duct 63 a homogeneous equal pressure gas mixture.

In addition, the hot water that has served as a coolant for cooling the exhaust gas is collected at the outlet of the recycling device 72 and transferred via a recycling line 740 to a mixer/valve 8 of hot water.

The traction system 1 also comprises a cooling system 75 of the heat engine 7. The cooling system 75 of the heat engine 7 uses a circulation of coolant to cool the engine 7. Here, the cooling system 75 uses cold water as the coolant. As for the recycling device 72, the cold water preferably has a temperature below 20° C. and comes from a branch 7204 of the water supply line 7200.

At the outlet of the cooling system 75, the hot water produced during the cooling of the heat engine 7 is transferred to the mixer/valve 8 with hot water via a recovery line 7500.

In this context, the hot water mixer/valve 8 receives the hot water from the cooling system 75 of the heat engine 7 and the recycling device 72, then transfers the first portion of hot water into a feed circuit 80 to the hot water supply channels 400 under electrolysis cells 40.

The mixer/valve 8 discharges a second part of the warm water to a discharge 7202 via a second discharge line 83.

In addition, the traction system 1 comprises a safety system 9 non-return flame which comprises a first pair of non-return flame valves disposed at the inlet and outlet of the mixer 61, a second flexible non-return valve a flame disposed at the level of the inlet 70 and an exhaust 72 of the heat engine 7, and the third pair of non-return valves disposed at the inlet and outlet of the exchanger of the recycling device 73 of the exhausts.

The use of a standard heat engine 7 makes it possible, on the one hand, to easily adapt the traction system 1 to a fleet of vehicles 2 already in circulation, and, on the other hand, to make a supply circuit 6 reversible which is adapted to switch to a fossil fuel supply in the event of a momentary shortage of supply of combustion gases from the renewable energy. However, the use of a standard heat engine has a low efficiency of converting the energy of the combustion gases into mechanical energy.

In a second exemplary embodiment of the invention illustrated in FIG. 3 to 10, the applicant has endeavored to develop a new two-cycle thermal engine that preserves the main advantages of the standard two-stroke heat engine, eliminating its main disadvantages.

In general terms, a two-stroke heat engine has the advantages of having a simple mechanical structure facilitating its maintenance, of being more powerful, less cumbersome and lighter than a four-stroke engine of the same displacement, of being usable in all positions without substantial modification, to have a wide range of use, low speeds below 2,000 rpm and very high speeds over 30,000 rpm, good performance of the order of 430 ch/L without turbo or compressor, and in the case of a two-stroke direct injection engine of low fuel consumption, less than 3 L/100 km.

Despite all these advantages, the two-stroke heat engine, formerly widely used, was gradually replaced by the more complex four-stroke engine, which is much less polluting. Indeed, in two-stroke engines, two main phenomena generate a significant pollution exhaust, on the one hand, too much distance traveled by the piston before closing the exhaust port which causes a loss of unburned fuel, and on the other hand, emissions of oils then less burned that are released into the atmosphere and come from a lubricant in the fuel to lubricate the cylinder. This is due to the fact that the fuel is fed into the lower crankcase, where the fuel is pre-compressed before passing through the cylinder in the crankcase. As a result, the two-stroke engine has no lubrication by the presence of oil and is kept in the lower crankcase. Lubricating oil is therefore mixed with air and fuel.

As illustrated in FIGS. 3 to 10, the applicant has developed a two-stroke combustion engine 700 comprising a crankcase 701 divided into two isolated compartments, at any time and in all circumstances, from each other. Indeed, the crankcase 701 comprises an upper crankcase 702 in which is formed a combustion chamber 7020, and a lower crankcase 703. The upper crankcase 702 and the lower crankcase 703 are connected by a cylinder 704. In this example, the lower crankcase 703 is filled with engine oil ensuring good lubrication of a crankshaft 705, which is disposed within the lower crankcase 703. The engine oil also serves to lubricate piston 706 which is movable between a rest position in which it is positioned in the cylinder 704 between the upper crankcase 702 and the lower crankcase 703, and a compression position in which it reaches the top 7021 of the 7020 combustion chamber. The top 7021 of the 7020 combustion chamber is located in the upper crankcase 702, opposite the lower crankcase 703. During an engine cycle, the piston 706 moves from one position to the other side by translational movement within the cylinder 704 from the lower crankcase 703 to the top 7021 of the combustion chamber 7020 and back down to the lower crankcase 703 to complete the engine cycle.

Here, the crankshaft 705 is eccentrically connected to the piston 706 through a connecting rod 707. The rod 707 is connected by a mechanical link rotating, on the one hand, axially to the piston 706, and on the other hand, eccentrically to the crankshaft 705 with the aid of a mechanical ball joint. This eccentric mechanical connection of the connecting rod 707 at the crankshaft 705 makes it possible to transform the translational movement of the piston 706, during the engine cycle, in continuous rotational movement of the crankshaft 705. In addition, the crankshaft 705 is integral with a rotation shaft which is itself connected to a rotary mechanical receiver adapted to drive means for propelling the vehicle 2.

In this example, the two-stroke engine 700 comprises sealing means cooperating with the piston 706 so as to hermetically isolate the upper crankcase 702 from the lower crankcase 703 at any time during the engine cycle and under any circumstances.

Advantageously, the insulation of the lower crankcase 703 relative to the upper crankcase 702, at any time and under any circumstances, makes it possible to prevent the engine oil present in the lower crankcase 703 from passing to the combustion chamber 7020 where it would be partially and/or totally burned and/or rejected in the exhausts. This characteristic, therefore, contributes to the elimination of polluting exhaust emissions, since the oil of the lower crankcase 703 never passes into the combustion chamber 7020. In addition, it is no longer necessary to introduce additional compounds to lubricate the cylinder 704 to facilitate the stroke of the piston 706 during the engine cycle. These additional compounds, which were previously partially burned and exhausted from the engine, were an important source of pollution.

Because of the insulation of the upper crankcase 702 with respect to the lower crankcase 703, the two-stroke engine 700 includes an inlet 70 whose intake port 712 is directly formed from a first side 7022 of the upper crankcase 702 at the level of the combustion chamber 7020. Thus, it is no longer necessary to add a lubricant to the fuel to grease the cylinder 704.

Advantageously, the introduction of a pressurized gaseous mixture makes it possible to reduce the dimensions of the intake port 712 compared with those of the intake port of a standard heat engine, in the context of the kinematics of the piston 706, the fact that they reduce the dimensions of the intake port 712 optimizes the cooperation between the piston 706 and the intake port 712. Indeed, it is possible to position the intake port 712 in a more optimal position so as to limit the stroke of the piston 706 between the intake port 712 and an exhaust port 714 which is arranged above the air intake port. This feature makes it possible to limit the washing time of the combustion chamber 7020 by a fresh gas mixture before restarting an engine cycle. This characteristic advantageously reduces gas mixture consumption. Here, the intake port 712 is connected to an intake duct 63 through which flows a flow of a pressurized gas adapted to explore by thermo catalysis.

In a known manner, when the two-stroke engine 700 is in operation, the oil contained in the lower crankcase 703 rises in temperature and expands. Thus, the volume of oil contained in the lower crankcase 703 expands from 8% to 15% of its cold volume. Consequently, the sealing means serve to maintain the hermetic isolation between the lower crankcase 703 and the upper crankcase 702, but also to prevent the expired oil from escaping through the intake port 712 and/or the exhaust port 714. Advantageously, the sealing means contribute to preventing lubricating oil from being rejected as exhaust from the two-stroke engine 700.

For this purpose, the sealing means comprise at least one sealing member 710 which equips the piston 706, preferably in the upper part 711 of the piston 706. In this example, the piston comprises a sealing member 710 formed by two segments (710c, 710d) disposed close to one another, the two segments surrounding the piston 706 at its upper portion 711.

Figures 3, 4:
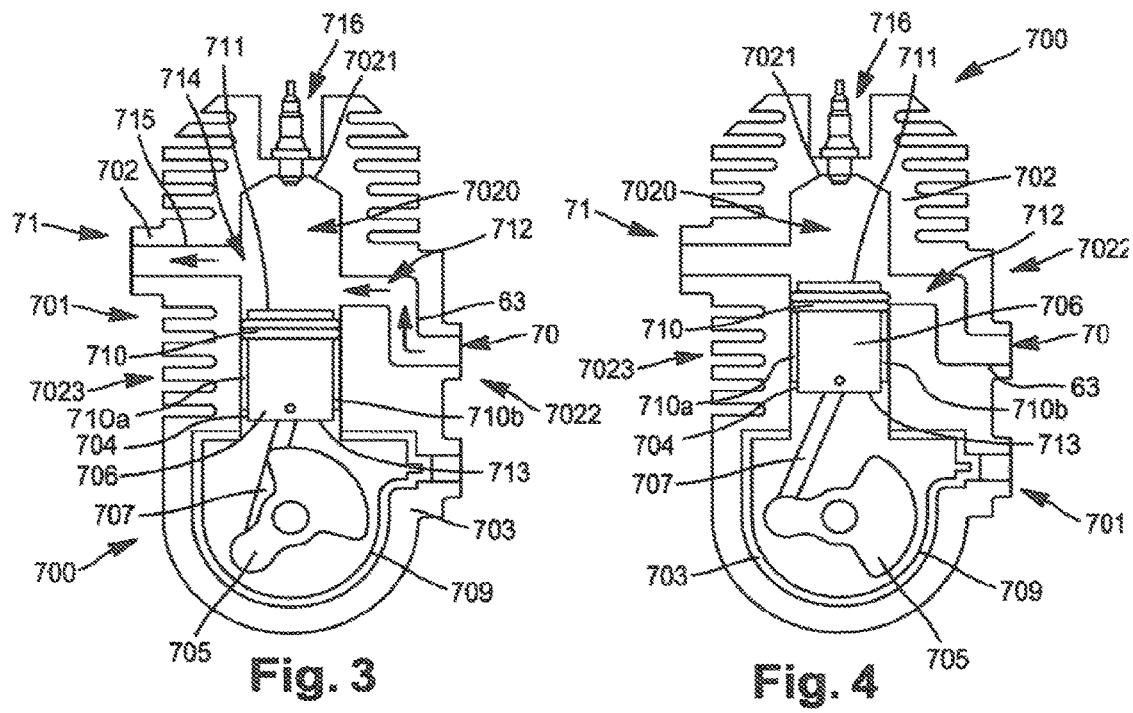
FIG. 3 to 10 are schematic views corresponding to a representation of a kinematic of a two-stroke gas engine used in the traction system according to a second embodiment of the invention.
Figures 5, 6:
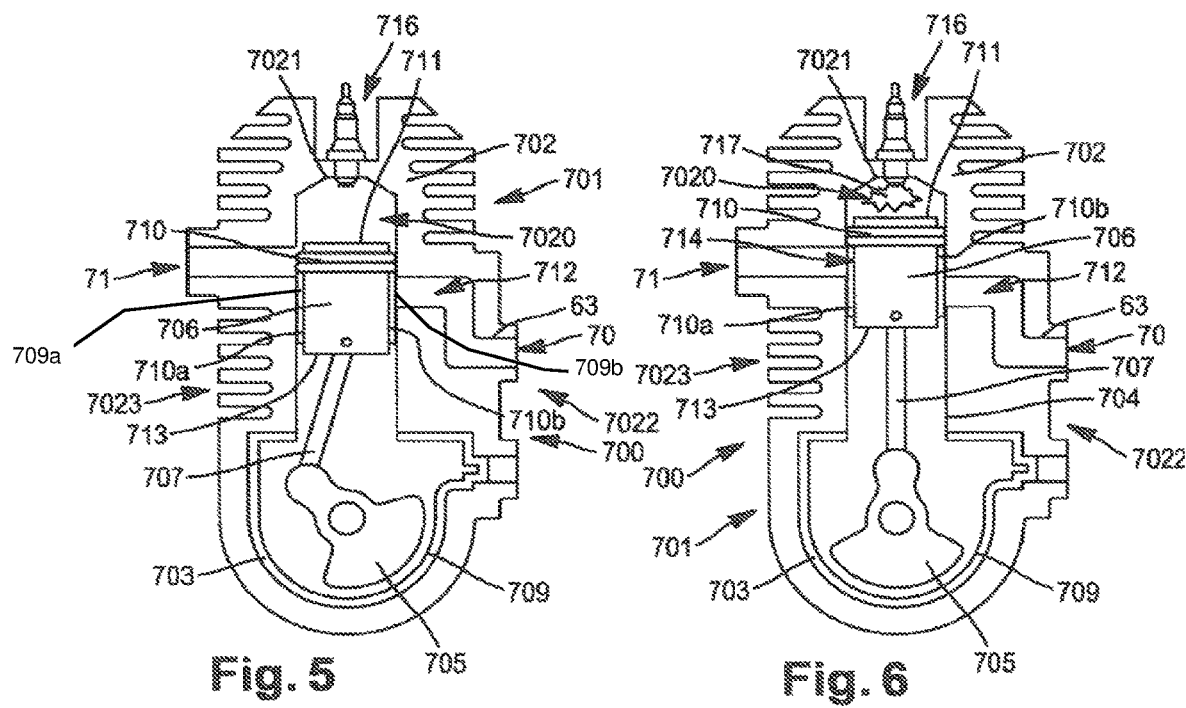

The sealing member 710 makes it possible to isolate the lower crankcase 703 from the upper crankcase 702 from the position of the bottom dead center of the piston (illustrated in FIG. 10) until the sealing member 710 reaches and exceeds the intake port 712 and/or the exhaust port 714 shown in FIGS. 4 to 6. In this situation of the kinematics of the piston 706, so that oil does not escape from the lower crankcase 703, the sealing means comprise two lateral sealing elements 710a, 710b (first sealing element 710a and second sealing element 710b). The lateral sealing elements 710a, 710b are mounted on the piston 706 so as to obstruct respectively the exhaust port 714 (second sealing element 710b) and the intake port 712 (first sealing element 710a). For these purposes, the lateral sealing elements 710a, 710b extend longitudinally on either side of the piston 706.

In practice, the lateral sealing elements 710a, 710b are respectively formed by two segments which extend in the same longitudinal direction, which is perpendicular to that in which the sealing member 710 is located. By their configuration, lateral sealing elements 710a, 710b contribute to confine the oil of the lower crankcase 703, and thus avoid any pollutant release into the exhaust of the two-stroke engine 700.

According to another embodiment, the sealing element 710a, 710b or sealing elements 710a, 710b can be replaced by an expansion system 709, which is formed by a membrane. The expandable membrane may be made of a polymerized and/or composite material having mechanical decorative properties. These mechanical deformation properties allow the membrane to deform during the upward and downward stroke of the piston 706. By deforming, the upper part of the membrane is deformed and/or expanded so as to obstruct the intake port 712 and/or exhaust port: 714. During the downward stroke of the piston 706, the membrane retracts and returns to its original shape.

According to another embodiment, the sealing elements 710a, 710b may be replaced by valves mounted at the intake ports 712 and/or exhaust ports 714. Advantageously, when the sealing member 710 reaches and/or exceeds the intake ports 712 and/or exhaust ports 174, the valves are configured to obstruct them.

In this example, the flow of gases from the pressure corresponds to the gas mixture dihydrogen/dioxygen/pressurized air that comes from the mixer 61 via the admission duct 63.

In order to generate the combustion of the gaseous mixture, the two-stroke engine 700 comprises an ignition system 716 adapted to create an electric arc capable of thermally catalyzing the combustion of the gaseous mixture pressurized and compressed in the cycle. Here, the ignition system 716 is formed by spark plugs which are disposed at the top 7021 of the combustion chamber 7020.

In addition, the two-stroke engine 700 has an exhaust 71 whose exhaust port 714 is cleaned from a second side 7023 of the upper crankcase 702 at the level of the combustion chamber 7020. Here, in the upper crankcase 702, the exhaust port 714 is positioned above the intake port 712.

Advantageously, the exhaust port 714 comprises a mechanical system that makes it possible to vary the height of the opening of the exhaust port 714 which makes it possible to limit the gaseous pressure losses, in particular for low and medium engine speeds. This feature increases the torque and flexibility of the two-stroke combustion engine.

In the present example, the exhaust port 714 is connected to an exhaust duct 715 conveying the engine exhaust to the recycling device 72 to recover unconsumed combustion gases and subsequently reinject them at the admission 70 level.

The two-stroke combustion engine 700 comprises a cooling system 75 of the cylinder 704. As previously described, in the case of an aquatic vehicle 2, the cooling system 75 is an open circuit utilizing the cold water from the middle of the water supply line 7200 which is fed by the hydraulic pump 7201.

In consideration of the characteristics of the two-stroke combustion engine 700 that have been described, the hopper cycle comprises an admission step illustrated in FIG. 3. During this admission step, the piston 706 is in the rest position, thus leaving the intake port 712 and the exhaust port 714 in the open position. The pressurized gaseous dihydrogen/dioxygen mixture enters through the intake port 712 into the combustion chamber 7020. Here, the flow of gas is shown schematically by arrows penetrating from the inlet duct 63 to the combustion chamber 7020.

The engine cycle has a step of which is illustrated in FIGS. 4 and 5. During these steps, the piston 706 moves to the rest position at its compression position, the piston 706 extends towards the top 7021 of the combustion chamber 7020. The sealing members 710 then seal the intake and exhaust ports 712, 714. This feature promotes, on the one hand, a good compression of the gaseous mixture present in the combustion chamber 7020, and on the other hand, the second sealing member 710 located in the lower part 713 of the piston 706 makes it possible to isolate the lower crankcase 703 of the engine intake 70 when the piston 706 is in the compression position or near the compression position (illustrated in FIGS. 5 to 7).

As illustrated in FIG. 6, the engine cycle comprises a step of igniting the gaseous mixture which occurs when the piston 706 reaches its compression position and its upper part 711 is located in the immediate vicinity of the top 7021 of the combustion chamber 7020. At this time, the ignition system 716 generates an electric arc that triggers the combustion of the compressed gas mixture. Here, the electric arc is symbolized by a spark 717 located between the piston 706 and the top 7021 of the combustion chamber 7020.

Figure 7:
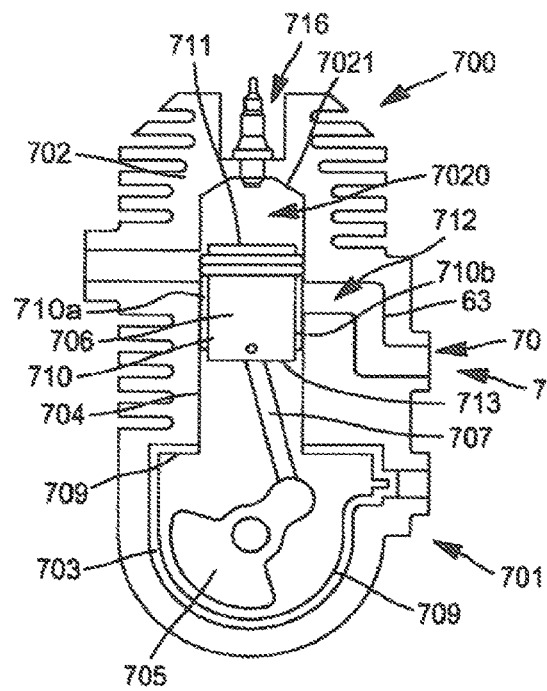

The combustion of the gaseous mixture is compressed and followed by an expansion step in which the piston 706 is pushed back to its rest position by the expansion of gas following the combustion, the rotation of the crankshaft 707 being caused by the descent of the connecting rod 707 which follows the movement of the piston 706 (shown in FIG. 7).

Figure 8:
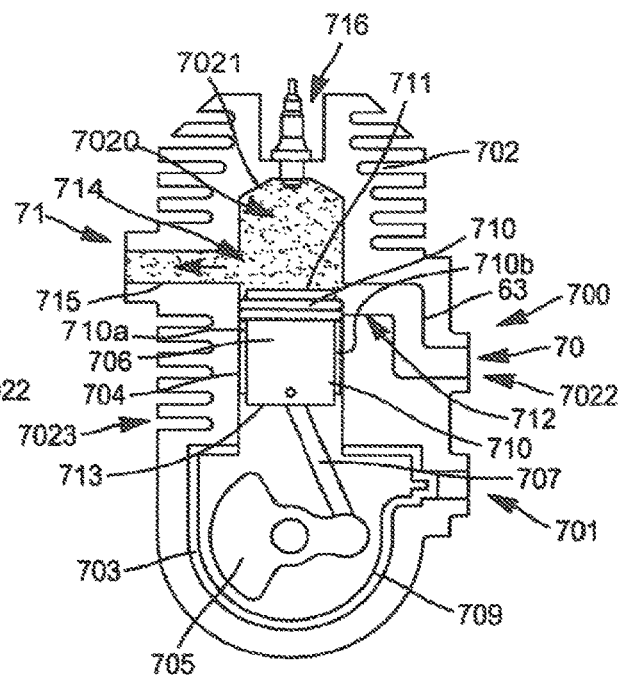

The example of the FIG. 8 illustrates an exhaust step which corresponds to the instant of the engine cycle in which the piston 706 is pushed lower than the exhaust port 714. The exhaust port then allows the gases from the combustion and unconsumed combustion gases from the combustion chamber 7020. Here, the exhaust gas after the combustion is illustrated by an arrow in the exhaust port 714 exiting from the combustion chamber 7020 towards the exhaust duct 715.

Figure 9:
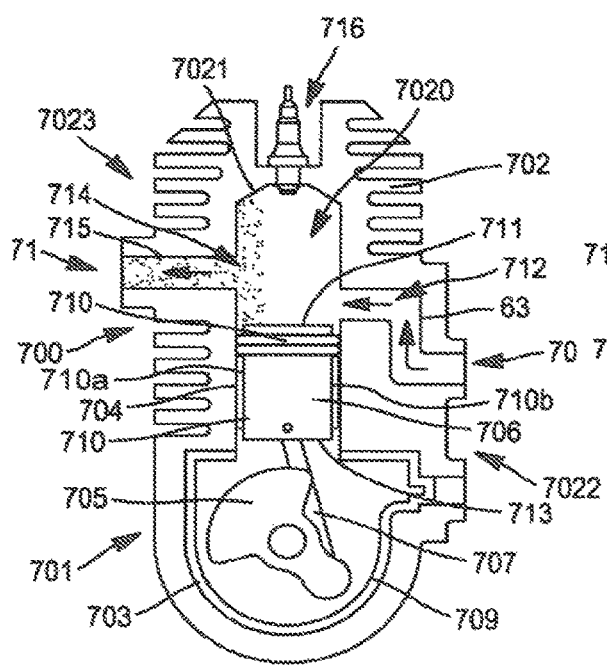
Figure 10:
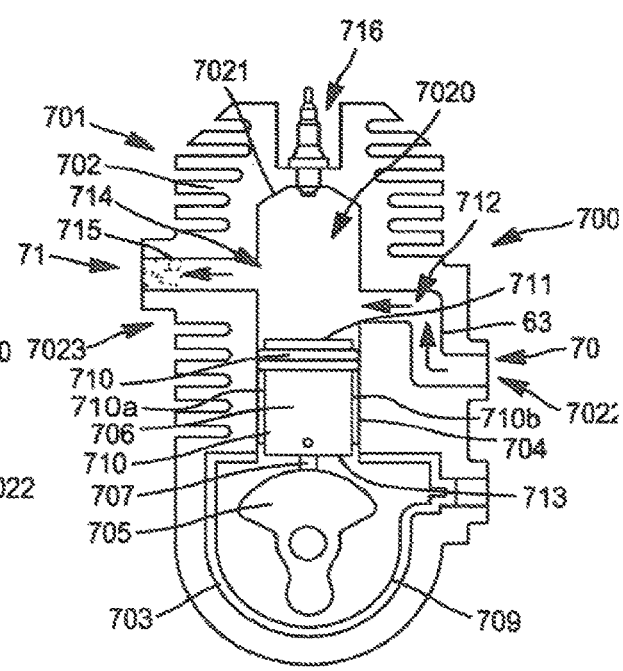

In order to start a new engine cycle, the engine cycle comprises a washing step of the combustion chamber 7020, which is illustrated in FIGS. 9 and 10. This step consists of flushing the exhaust port 714 of gas from the combustion of the engine cycle which ends and replacing it with a fresh pressurized gas mixture. For this purpose, this step is only possible when the piston 706 is pushed back below the intake port 712 within the cylinder 704, a situation in which the intake port 712 is open and allows the entry of gaseous mixture (illustrated by arrows).

Following the washing step, a new engine cycle starts as described above.

It should be noted that here, the surplus gaseous mixture used to wash the combustion chamber 7020 is recovered at the recycling device 72 to be reinjected at the intake port 712 (see above). This characteristic allows the efficiency of the two-stroke engine 700, and to avoid any pollutant discharge subsequent to engine cycle.

According to another characteristic of the invention, such a two-stroke engine 700 can also fit a land vehicle such as an automobile.

However, in certain particular cases, for example, a small aquatic vehicle 2 or a terrestrial vehicle 2 or in rare cases where the atmospheric conditions do not allow a sufficient production of dihydrogen and dioxygen for the operation of the two-stroke combustion engine 700, the production of dihydrogen and dioxygen can be achieved, landed, and desynchronized thanks to the renewable energies exploited in the present invention.

For this problem, it is expected that in the manner of a conventional vehicle, the user of such a vehicle 2 can, before moving, refuel these storage units 55, 56 of dihydrogen and dioxygen under gaseous force or in the form of liquefied gas.

I claim:

1. A two-stroke combustion engine, comprising: a crankcase being comprised of an upper crankcase and a lower crankcase; a sealing means between said lower crankcase and said upper crankcase so as to seal oil within said lower crankcase relative to said upper crankcase, wherein said upper crankcase comprises: a combustion chamber; an intake port in fluid connection with said combustion chamber so as to introduce a gaseous fuel based on dihydrogen and dioxygen to said combustion chamber, and an exhaust port in fluid connection with said combustion chamber so as to only discharge water vapor and unconsumed gaseous fuel without oil from said lower crankcase, exhaust port being sealed relative to said lower crankcase; an exhaust gas recycling device being in fluid connection with said exhaust port so as to recover said unconsumed gaseous fuel and being in fluid connection with said intake port so as to reinject said unconsumed gaseous fuel to said combustion chamber and separate said water vapor; a heat exchanger in heat transfer relationship with said exhaust gas recycling device so as to separate said water vapor by condensation; and a piston being positioned within said lower crankcase and having an upper part, wherein the sealing means is comprised of a sealing member removably engaged with said upper part of said piston, wherein said sealing member is comprised of: two segments surrounding said piston and disposed close to one another; and a sealing element extending down said piston from said two segments, facing said intake port so as to seal against said intake port, and facing said exhaust port so as to seal against said exhaust port.

2. The two-stroke combustion engine, according to claim 1, further comprising:
   a heat exchanger in heat transfer relationship with said exhaust gas recycling device so as to separate said water vapor by condensation.

3. A two-stroke combustion engine, comprising:
   a crankcase being comprised of an upper crankcase and a lower crankcase;
   a sealing means between said lower crankcase and said upper crankcase so as to seal oil within said lower crankcase relative to said upper crankcase,
   wherein said upper crankcase comprises:
      a combustion chamber;
      an intake port in fluid connection with said combustion chamber so as to introduce a gaseous fuel based on dihydrogen and dioxygen to said combustion chamber, and
      an exhaust port in fluid connection with said combustion chamber so as to only discharge water vapor and unconsumed gaseous fuel without oil from said lower crankcase, exhaust port being sealed relative to said lower crankcase;
      an exhaust gas recycling device being in fluid connection with said exhaust port so as to recover said unconsumed gaseous fuel and being in fluid connection with said intake port so as to reinject said unconsumed gaseous fuel to said combustion chamber and separate said water vapor;
      a heat exchanger in heat transfer relationship with said exhaust gas recycling device so as to separate said water vapor by condensation; and
      a piston being positioned within said lower crankcase and having an upper part,
   wherein the sealing means is comprised of a sealing member engaged with said upper part of said piston,
   wherein the sealing means is further comprised of a first sealing element adjacent said sealing member and facing said intake port so as to seal against said intake port and a second sealing element adjacent said sealing member and facing said exhaust port so as to seal against said exhaust port, and
   wherein said first sealing element and said second sealing element are mounted laterally on said piston and extend longitudinally on a respective side of said piston from said sealing member.

4. The two-stroke combustion engine, according to claim 1, further comprising:
   a mixer in fluid connection with said intake port so as to mix dihydrogen and dioxygen of the gaseous fuel.

5. The two-stroke combustion engine, according to claim 4, further comprising:
   a compressed air supply in fluid connection with said mixer so as to mix dioxygen and dihydrogen with compressed air for a variable concentration of dioxygen and dihydrogen in the gaseous fuel.

6. The two-stroke combustion engine, according to claim 5, wherein said mixer is in fluid connection with said intake port via an intake duct.

7. The two-stroke combustion engine, according to claim 4, wherein said mixer is in fluid connection with said exhaust gas recycling device through a recovery duct so as to reinject said unconsumed gaseous fuel.

8. The two-stroke combustion engine, according to claim 1, wherein said exhaust port is positioned further from said lower crankcase than said intake port.

9. The two-stroke combustion engine, according to claim 1, wherein the sealing means is comprised of an expansion system.

* * * * *